United States Patent
Bharathula

(10) Patent No.: US 8,843,940 B2
(45) Date of Patent: Sep. 23, 2014

(54) CENTRALIZED AUDIT AND ERROR HANDLING

(75) Inventor: Madhu Bharathula, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 275 days.

(21) Appl. No.: 13/070,107

(22) Filed: Mar. 23, 2011

(65) Prior Publication Data

US 2012/0222048 A1 Aug. 30, 2012

Related U.S. Application Data

(60) Provisional application No. 61/447,523, filed on Feb. 28, 2011.

(51) Int. Cl.
G06F 3/00 (2006.01)
G06F 11/30 (2006.01)
G06F 11/07 (2006.01)

(52) U.S. Cl.
CPC ........ *G06F 11/3068* (2013.01); *G06F 11/0784* (2013.01); *G06F 11/0709* (2013.01); *G06F 11/3006* (2013.01); *G06F 11/302* (2013.01)
USPC ........... 719/316; 719/314; 719/318; 719/313

(58) Field of Classification Search
None
See application file for complete search history.

(56) References Cited

U.S. PATENT DOCUMENTS

| | | | |
|---|---|---|---|
| 5,032,979 A * | 7/1991 | Hecht et al. | 726/25 |
| 6,567,837 B1 * | 5/2003 | Robinson | 718/1 |
| 7,937,433 B1 * | 5/2011 | Kumar | 709/203 |
| 8,261,286 B1 * | 9/2012 | Fateev et al. | 719/314 |
| 2002/0049886 A1 * | 4/2002 | Furuya et al. | 711/114 |
| 2002/0049962 A1 * | 4/2002 | Kelbaugh et al. | 717/128 |
| 2003/0236720 A1 * | 12/2003 | White et al. | 705/30 |
| 2004/0221261 A1 * | 11/2004 | Blevins | 717/107 |
| 2005/0193043 A1 * | 9/2005 | Hoover | 707/204 |
| 2007/0121822 A1 * | 5/2007 | Carnale et al. | 379/88.14 |
| 2008/0196041 A1 * | 8/2008 | Gregg et al. | 719/318 |
| 2009/0060476 A1 * | 3/2009 | Iwamoto et al. | 386/126 |
| 2010/0107165 A1 * | 4/2010 | Koskimies et al. | 718/100 |
| 2010/0241759 A1 * | 9/2010 | Smith et al. | 709/233 |
| 2011/0055038 A1 * | 3/2011 | Mengerink | 705/26.1 |
| 2012/0071145 A1 * | 3/2012 | Erhart et al. | 455/414.3 |

* cited by examiner

*Primary Examiner* — Tuan Dao

(57) ABSTRACT

Audit objects generated by applications executing on one or more computers are received in a central queue. Each audit object is generated responsive to a transaction occurrence in the execution of an application. Each audit object includes detailed information about the transaction occurrence, including information identifying the application and the transaction that occurred. Each audit object in the central queue is transformed from a format used by the application into a common format for audit processing with respect to all of the applications. At least some of the formats used by the applications are different. Each transformed audit object is placed into a record in a central database for the respective application by populating the detailed information about the transaction occurrence from each transformed audit object into fields of the record in the database for the respective application.

16 Claims, 11 Drawing Sheets

CENTRALIZED AUDIT AND ERROR HANDLING

RELATED APPLICATIONS

This application claims the benefit of priority to U.S. Provisional Patent Application No. 61/447,523, filed on Feb. 28, 2011, the contents of which are herein incorporated by reference in their entirety.

TECHNICAL FIELD

The present subject matter relates to techniques and equipment to centralize audit and/or error handling in distributed application data processing systems.

BACKGROUND

Many different enterprises run complex networks of servers to implement various automated communication functions for the enterprise. For example, as mobile wireless communications have become increasingly popular, carriers such as Verizon Wireless™ have customer communication systems to provide notifications of account related activities to their customers, for example, as emails and/or as Short Message Service (SMS) messages to account holders' mobile stations. Because of the large number of customers served by a major carrier, and the level of account activities, the volume of notification message traffic is fairly large. To effectively provide such notifications, Verizon Wireless™ implemented its Customer Communication Enterprise Services (CCES) as an enterprise middleware web service.

At a high level, the CCES middleware comprises a web server layer and an application server layer. The architecture allows clients to send a request, for example for a notification, to a web server. The http web server then forwards the client request to one of a number of application servers. Each application server has multiple applications running on it. The application server determines the proper application to process the client request based on the context root of the client request. The application server processes the client request, in the CCES example, by sending one or more request messages to a backend system such as the Vision Billing System, MTAS, the SMS gateway and others, for example, to implement account activity and to initiate subsequent automatic notification thereof to the account holder. Once the application server has processed the request, a reply is then sent back to the web server which will then forward the reply back to the client.

In such an arrangement, the increasing number of applications in the distributed processing system creates more demand for audit data from the applications to enable trouble shooting of production or operations issues. Presently, applications generate log files containing the entire log statements. In order to conduct an audit, log files are scanned at the end of night, and information is logged into a database. Similarly, to identify errors and generate error files, keywords in log files are searched. This is an inefficient and time consuming process. Hence, a need exists for improved techniques for generating audit data and/or reporting errors in the context of an enterprise distributed application data processing system.

SUMMARY

In one general aspect, the instant application describes a method that includes a step of receiving in a central queue audit objects generated by a plurality of applications executing on one or more computers. Each audit object is generated responsive to a respective transaction occurrence in the execution of a respective application in the one or more computers. Each audit object includes detailed information about the respective transaction occurrence, including information identifying the respective application and the respective transaction that occurred. The method also includes a step of transforming each audit object in the central queue from a format used by the respective application into a common format for audit processing with respect to all of the applications, at least some of the formats used by respective applications being different from each other. Each transformed audit object is placed into a record in a central database for the respective application, wherein placing includes populating the detailed information about the respective transaction occurrence from each transformed audit object into fields of the record in the database for the respective application.

The above general aspect may include one or more of the following features. The detailed information may include application ID, service ID, transaction ID, mobile number, transaction type, response message, status, request time, or source of request. The method may further include a step of identifying a transformer for transforming each audit object in the central queue from the format used by the respective application into the common format. Identifying the transformer may include identifying the transformer based on the respective application ID. The method may further include a step of receiving a message at a centralized audit message bean that the audit object is placed on the central queue. In response to the message, the audit object is retrieved from the central queue and a transformed is identified based on a type of the retrieved audit object. The method may further include a step of calling the identified transformer to transform the audit object from the format used by the respective application into the common format.

Placing each transformed audit object into the record in the central database for the respective application may include passing a name of the central database for the respective application to a Data Access Object which may interface with the central database and may create the record in the central database. The method may further include a step of receiving in a central queue error objects generated by the plurality of applications. Each error object may be generated responsive to a respective error occurrence in the execution of a respective application in the one or more computers. Each error object may include detailed information about the respective error occurrence, including information identifying the respective application with respect to which the respective error occurred and information about the respective error that occurred. Each error object may be placed into a record in a central error table. Placing the error object into the record in the central table may include populating the detailed information about the respective error occurrence from each error object into fields of the record in the error table.

Other concepts relate to one or more hardware platforms programmed or otherwise configured so as to be able to implement either one or both of the centralized audit and error handling functions. Other concepts relate to unique software for implementing either one or both of the centralized audit and error handling techniques. A software product, in accord with this type of concept, includes at least one machine-readable medium and programming carried by the medium for exaction by one or more computers that may perform the centralized audit and/or error handling.

The exemplary solution offers a variety of benefits or advantages, such as the following: (1) code is centralized, is not duplicated for each of the modules, and is reused, thereby improving the maintainability and resulting in high cohesion; (2) auditing can be switched on/off with a database update rather than a code change; (3) audit fingerprints can be enabled based on the flag in the database rather than through the code change; (4) addition of new applications to use audit framework is pretty easy with no code changes; and (5) audit and error handling is performed asynchronously which has zero impact on the system response time to the customer.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
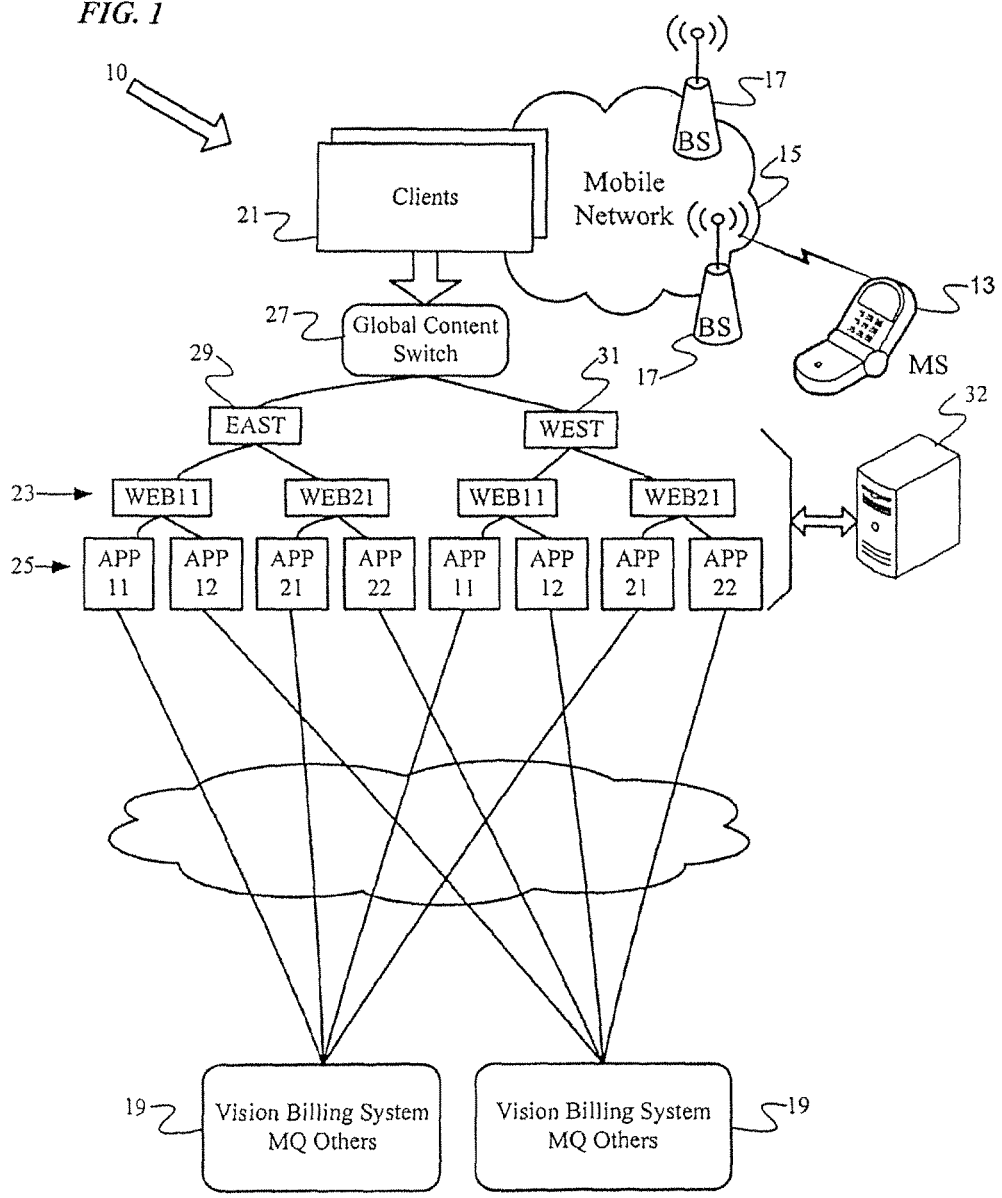
FIG. 1 is a high-level functional block diagram of a mobile carrier network and associated equipment for Customer Communication Enterprise Services (CCES), which may implement a web server thread count analyzer.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The exemplary solution centralizes audit and error handling in a distributed application data processing system, such as enterprise applications implemented as web services type middleware running on one or more computer platforms to improve the auditing and error handling processes. In one implementation, centralizing audit and error handling means that the code for audit and error handling is common to the various applications and is not duplicated for each of the applications. The code for audit and error handling interfaces with various applications and performs the auditing and error handling for each of the applications.

In the examples, the centralized audit and error handling functions may be implemented as one or more Java based applications. The centralized audit and error applications perform auditing and error handling now (e.g., when a request is sent to the application instead of waiting until the end of night to perform auditing and error handling). That is, when the auditing is on for an application and when the application receives a request, the application creates an audit object at the start of the request and populates it with the basic request details. After the request is fulfilled, at the end, the audit object will be updated with the response details and then put the centralized audit queue. Thereafter, the audit object is retrieved from the centralized audit queue and placed in the application specific audit table. As such, with the techniques discussed in the instant application, the application does not need to wait until the end of night to scan log files in order to conduct an audit.

Similarly, when the error handling is on for the application and when the application encounters an error, the application calls an appropriate error handler, which creates an error object and places the error object in a centralized error queue. Thereafter, the error object is retrieved from the centralized error queue and placed in a central error table. As such, with the techniques discussed in the instant application, the application does not need to wait until the end of night to search keywords in log files to identify errors.

Furthermore, audit and error data may be placed in a more manageable format through the use of a database. The audit database includes a separate section for storing various data retrieved from the audit object. For example, the audit database includes a separate column for storing details regarding transaction ID, request type, request message, and response message. The central error database also stores errors of various applications in separate sections such that the errors associated with the specific application can be accessed more easily. For example, errors associated with a first application are stored in a first column, whereas the errors associated with a second application are stored in a second column. As a result, audit and error reports are generated more easily using the database. With the exemplary audit handling framework, based on the business requirements, if an application requires audit handling, the application will create an audit object and populate it with the application-specific details.

The details, for example, include: application ID, service ID, mobile number, transaction ID, request type, request message, response message, status, request time, and source of request. The application ID identifies the particular application for which auditing is being performed. The application ID may be the pound function. The service ID represents the various services the same application is offering and is used to differentiate these services for auditing. The service ID may be #min, #bal, #data, etc. The mobile number is the phone number of the customer. The transaction ID is a unique identification the system generates to identify the transaction. The request types are the various types of requests that the application handles. For example, for GW application, the various request types are listmail, getmail, deposit, etc. The request message is the xml request, which is received from the handset or other applications. The response message is the xml response, which is sent back in response to the request message. The status mentions the request status whether it is a success or failure. For example, status 000 is used for a successful response and any non-zero number status is used for an unsuccessful response. The request time is the time at which the request is received. The source of request identifies the requester, such as, for example, the handset or manager application.

For example, in a Gateway application, the entries in the audit object are "GWApplicatoin", "VZW GW Service", "7324008888", "VZW-1020-1111111", "getMessageHeaders", "<listmail tid='VZW-1020-7323798266' user='7324008888 location='VZWX' passcode='xxxxxx'/>", "<listmail user="7324008888" quota="4/40 111/32000" newlocation="VZWL10.194.47.98/4:7324251331:A: AP1247:ms02::20703"><message id="175" read="N" callerid="7324251331" time="Fri, 10 Sep. 2010 16:17:10-0400" expires="Wed, 20 Oct. 2010 15:17:10-0500" length="14" duration="14" size="24375" replyable="y" type="voice"/></listmail>", "000", sysdate, "MGR."

Hence, the audit object provides detail about the application transaction. At the end of the transaction, the application will drop the audit object in a centralized audit queue. On the other end, a centralized audit message bean, which is a program within the centralized audit application, listens to the centralized audit queue and will pick up the audit object from the centralized audit queue. The audit object has a specific type based on, for example, the application creating the audit object. For example, if a Preference Center application is creating an audit object, the specific type of the audit object type will be "PrefCenter." This differentiates the audit objects of the Preference Center application from the audit objects of other application. Based on the audit object type, the centralized audit message bean will call an appropriate transformation handler, which will transform the audit object into a generic audit object having a format that is common for the audit tables and create an entry in an audit table for the respective application.

Sample Profile Update audit object:
private Long uniqueId;
private String service_name;
private String req_type;
private String mdn;
private String cust_id;
private String acct_no;
private String request;
private String synchResponse;
private String asynchResponse;
private String request_TS;
private String response_TS;
private Long response_time;
private String process_type;
private String server;
private XmlObject auditLog;
private List tranLogs;

The Profile Update transformer will set the table name for JDBC Dao and transforms the Profile Update audit object to a common audit object by setting the relevant fields below:
public static final String req_id="req_id";
public static final String appl_id="appl_id";
public static final String service_name="service_name";
public static final String trns_type="trns_type";
public static final String notification_address="notification_address";
public static final String external_sys="external_sys";
public static final String customer_id="customer_id";
public static final String acct_no="acct_no";
public static final String req_input="req_input";
public static final String sync_resp="sync_resp";
public static final String async_resp="async_resp";
public static final String req_ts="req_ts";
public static final String resp_ts="resp_ts";
public static final String response_time="response_time";
public static final String client_id="client_id";
public static final String process_type="process_type";
public static final String server="server";
public static final String flex_field1="flex_field1";
public static final String flex_field2="flex_field2";
public static final String flex_field3="flex_field3";
public static final String sub_trns_type="sub_trns_type";
public static final String msg_type="msg_type";
public static final String status="status";
Common audit table:

| Name | Data Type | |
|---|---|---|
| REQ_ID | NUMBER(30,0) | NOT NULL |
| APPL_ID | VARCHAR2(50) | |
| SERVICE_NAME | VARCHAR2(50) | |
| TRNS_TYPE | VARCHAR2(25) | |
| NOTIFICATION_ADDRESS | NUMBER(10,0) | |
| EXTERNAL_SYS | VARCHAR2(20) | |
| CUSTOMER_ID | VARCHAR2(10) | |
| ACCT_NO | VARCHAR2(5) | |
| REQ_INPUT | VARCHAR2(3000) | |
| SYNC_RESP | VARCHAR2(3000) | |
| ASYNC_RESP | VARCHAR2(3000) | |
| REQ_TS | DATE | |
| RESP_TS | DATE | |
| RESPONSE_TIME | NUMBER(10,0) | |
| CLIENT_ID | VARCHAR2(20) | |
| PROCESS_TYPE | VARCHAR2(25) | |
| SERVER | VARCHAR2(50) | |
| FLEX_FIELD1 | VARCHAR2(100) | |
| FLEX_FIELD2 | VARCHAR2(100) | |
| FLEX_FIELD3 | VARCHAR2(100) | |
| DATE_LOADED | DATE | NOT NULL |
| SUB_TRNS_TYPE | VARCHAR2(200) | |
| MSG_TYPE | VARCHAR2(10) | |

With the exemplary error handling framework, if the application encounters an error that should be logged to the error table, the application creates an error object and drops it in a centralized error queue. A centralized error message bean listens to the centralized error queue and will pick up the error object to make an entry to the error table with the appropriate application specific details.

Reference now is made in detail to the examples illustrated in the accompanying drawings and discussed below. FIG. 1A is a high-level functional block diagram of a mobile carrier network and associated equipment for CCES, which implements centralized audit and error handling. At a high level, the system 10 includes mobile carrier network 15 offering a variety of mobile communication services to users of any number of mobile stations. The example shows simply one mobile station (MS) 13 as well as a general cloud representation of a mobile communication network 15. The network 15 provides mobile wireless communications services to any number of mobile stations 13, for example, via a number of base stations (BSs) 17. The network 15 generally may be any of a variety of available mobile networks, and the drawing shows only a very simplified example of a few elements of the network for purposes of discussion here. The network 15 allows users of the mobile stations such as MS 13 to initiate and receive telephone calls to each other as well as through the public switched telephone network or "PSTN" (not shown) and telephone stations connected to the PSTN.

CCES services are implemented using instances of the IBM Websphere Application Server (WAS). Websphere is a software product for integrating electronic business applications across multiple computing platforms, using Java-based Web technologies. The Websphere implementation offers a readily scalable distributed architecture. In such an implementation, there are multiple web servers 23, and each web server communicates with applications running on a number of associated application servers 25.

At a high level, the CCES middleware consists of servers that comprise the web server layer and the application layer. The architecture allows each of the mobile stations 13 to send a request through the clients 21 to a global content switch 27 that then sends the request to one of the web servers 23. The web server 23 will then route the request to an application server 25. In the example shown, there is one global content switch 27 and two regional (one East and one West) content switches 29, 31 to distribute the traffic. The CCES systems in the example include two web servers (WEB11 and WEB21) associated with each regional content switch. Those skilled in the art will appreciate that this is a relatively simply example, and that an actual implementation may include more content switches, web servers and application servers.

The CCES middleware structure is set up so that the global content switch 27 will accept a request from a client and route that request to one of the regional content switches, that is to say in our example, either to the East content switch 29 or the West content switch 31 depending on where the request came from. The content switch then forwards the request to one of two different web servers, selected in a round robin fashion to distribute the processing load. In the example, the East or West content switch determines which server platform WEB11 or WEB21 to forward the request in a round about fashion to distribute the process load. The server platforms WEB11 and WEB21 route the request to an application based on the context root of the request.

The application server 25 determines the proper application to process the client request based on the context root of the client request. The application server 25 processes the client request by sending one or more request messages to a backend system such as the Vision Billing System 19 to implement account activity and to initiate subsequent automatic notification thereof to the account holder. Once the application server 25 has processed the request, a reply is then sent back to the web server 23 which will then forward the reply back to the client 21.

Figure 2:
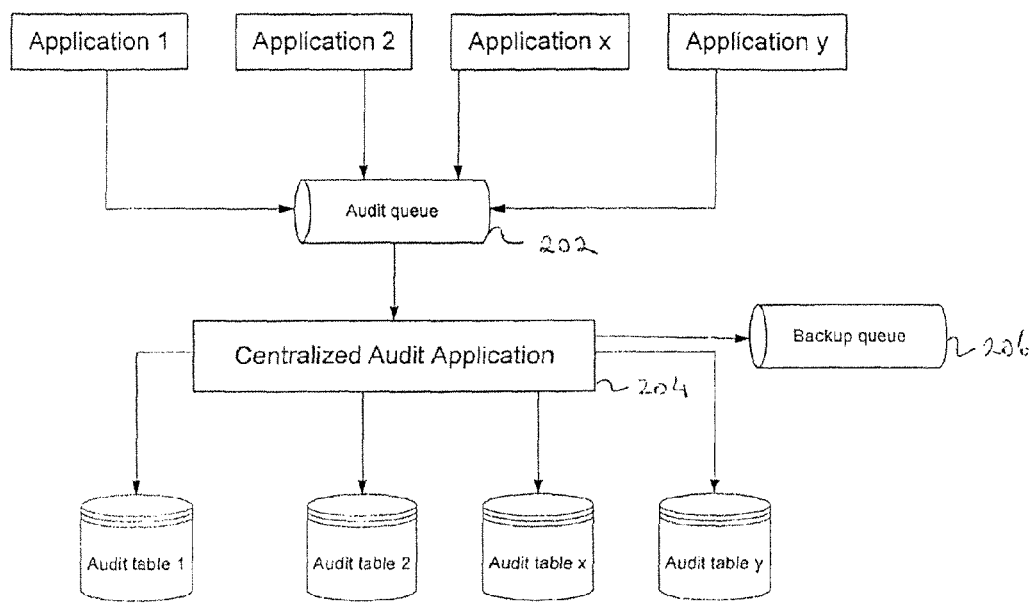
FIG. 2 illustrates an exemplary architecture diagram for centralized audit handling.
Figure 6:
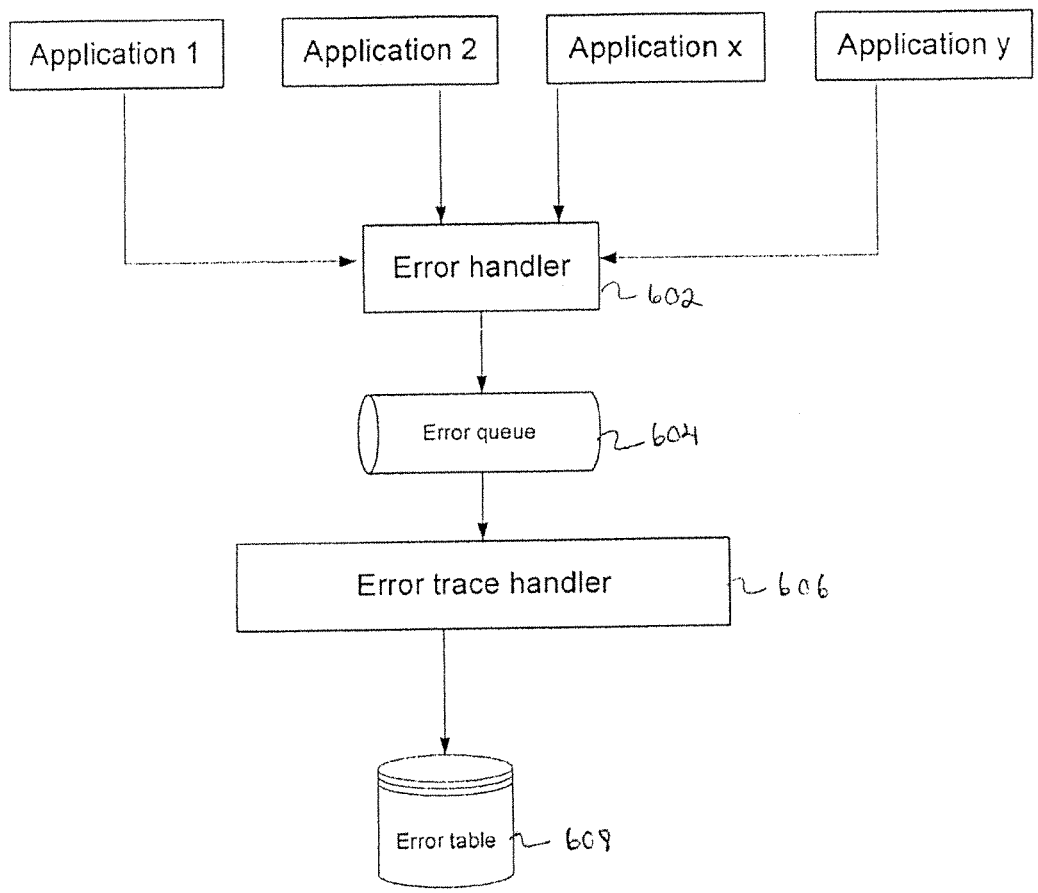
FIG. 6 illustrates an exemplary architecture diagram for centralized error handling.
Figure 7:
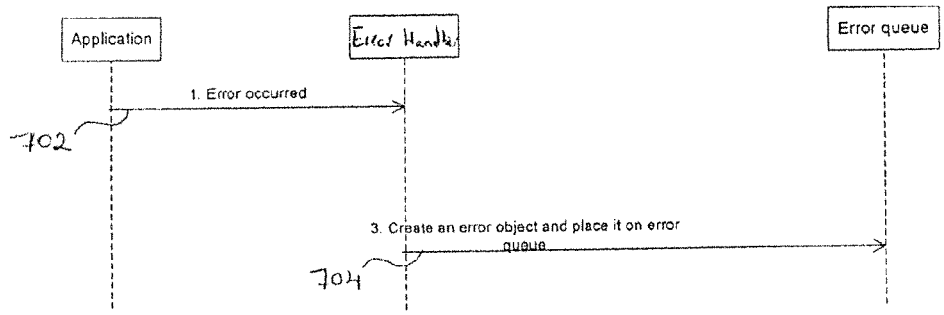
FIG. 7 illustrates an exemplary process for creating an error object and placing the error object on a centralized error queue
Figure 8:
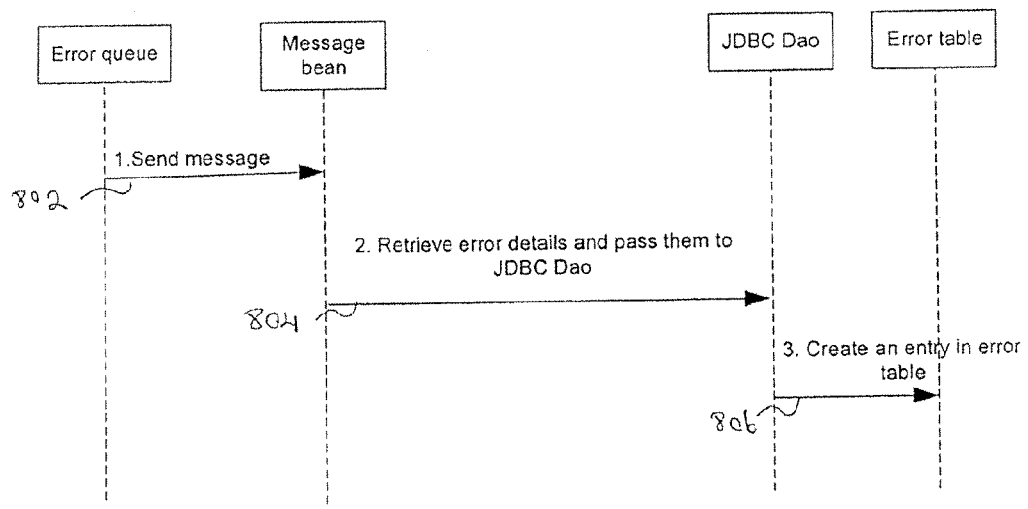
FIG. 8 illustrates an exemplary process for placing an error object in a central error table.

The system 10 also includes a server 32 which may run one or more applications for audit and error handling. FIG. 2 illustrates an exemplary architecture diagram for centralized audit handling. FIG. 6 illustrates an exemplary architecture diagram for centralized error handling. FIGS. 3-5C illustrate an exemplary process for centralized audit handling. FIGS. 7 and 8 illustrate an exemplary process for centralized error handling.

Referring to FIG. 2, the centralized audit handling is briefly described. If an application (e.g., application 1, 2, x, and/or y) requires centralized audit handling, the application generates an audit object responsive to a respective transaction occurrence in the execution of the application. The application populates the audit object with the transaction specific details. The details, for example, include: application ID, service ID, mobile number, transaction ID, request type, request message, response message, status, request time, and source of request. At the end of transaction, the application drops the audit object in a centralized audit queue 202. The centralized audit application 204 listening to the centralized audit queue 202 retrieves the audit object from the centralized audit queue 202. The centralized audit application 204 then transforms the audit object into a common audit object and creates an entry in an appropriate application specific audit table.

The audit object has a specific type based on, for example, the application creating the audit object. Based on the audit object type, an appropriate transformation handler is used to retrieve the audit data from audit object and to create an entry in the appropriate application specific audit table. For example, if the audit object corresponds to the first application (e.g., application 1), the appropriate transformation handler corresponding to the audit object retrieves the audit data from audit object and creates an entry in the audit table 1 corresponding to the first application. Similarly, if the audit object corresponds to the second application (e.g., application 2), the appropriate transformation handler corresponding to the audit object retrieves the audit data from audit object and creates an entry in the audit table 2 corresponding to the first application. If an error occurs in identifying an appropriate transformation handler, retrieving audit data from the audit object, and/or creating an entry in the application specific audit table, the audit object will be placed on the backup queue 206 and backup queue process is initiated for creating an entry in the application specific audit table as described in more detail below with respect to FIGS. 4-5B.

To illustrate one specific example, a Visual Voice Mobile (VVM) Gateway application may have a business requirement to store the audit data. A new audit table VVM Gateway Log is created. When the VVM Gateway application receives the request, the VVM Gateway application creates a new audit object (e.g., VVMGatewayLog) and populates the new audit object with values such as, for example, application ID, service ID, mobile number, transaction ID, request type, request message, response message, status, request time, and source of the request. Then, the audit object will be dropped in the centralized audit queue 202. The centralized audit application 204 listening to the centralized audit queue 202 will pick up the audit object from the centralized audit queue 202. Based on the application ID and service ID, the centralized audit application 204 will select a gateway transformer. The gateway transformer will convert the audit object into a common audit object populating the common audit object with data retrieved from the audit object. Then, the gateway transformer will pass the common audit object and a gateway audit table name to a Data Access Object (e.g., JDBC DAO), which provides an interface to the gateway audit table (e.g. VVMGatewayLog table) and creates an audit entry in the gateway audit table.

Figure 3:
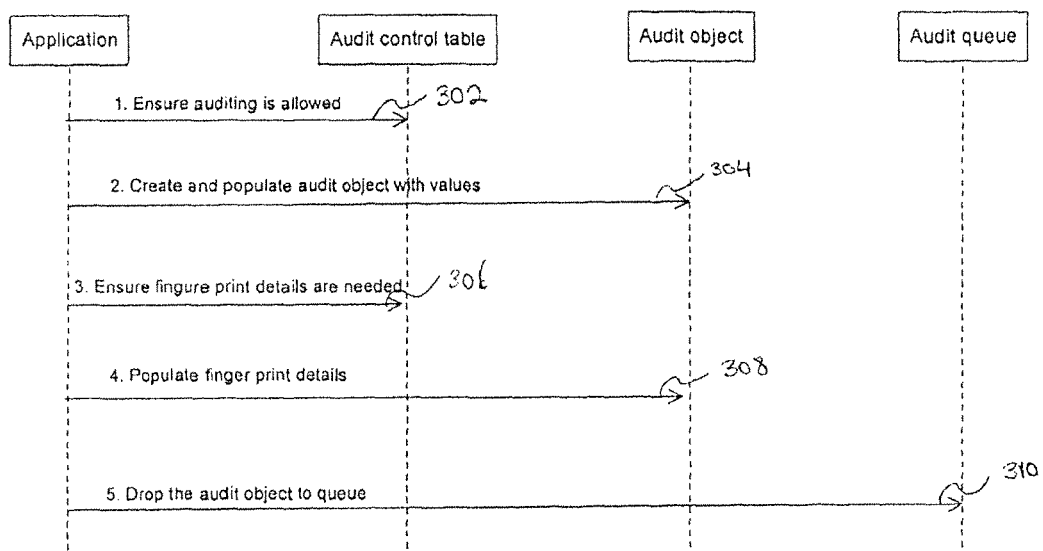
FIG. 3 illustrates an exemplary process for generating an audit object and placing the audit object in a centralized audit queue.

FIG. 3 illustrates an exemplary process for generating an audit object and placing the audit object in a centralized audit queue. The process begins with an application ensuring that auditing is allowed by checking an audit control table (Step 302). This step is performed responsive to a specific transaction in the execution of the application. The mobile service provider (e.g., Verizon Wireless™) determines if the application's audit data is critical for the business flow. The application's audit data is critical for the business flow if the application's audit data directly impacts the customer's experience with the mobile service provider. For example, if the customer is paying a monthly payment for a particular application to the mobile service provider, then the customer expects that application to work properly. As such, the audit data of that application is deemed to be critical and the mobile service provider records the audit data. In keeping with the previous example, the Preference Center application deals with the preferences of the customer. Thus, the audit data of the Preference Center application is important to trouble shoot customer's issues and to monitor the application performance. If the application's audit data is critical to the business flow, an entry is created in an audit control table. In one implementation, the audit control table is stored in server 32 shown in FIG. 1.

The audit control table controls the configuration details of applications wishing to participate in the centralized audit process. Configuration details include application ID, service name, high-level logging (yes/no), queue details from which audit objects are expected, backup queue details like queue manager and queue name, in-depth logging (yes/no), and date updated. To this end, the audit control table provides options for allowing an application to switch on/off the centralized audit process. As noted above, the audit control table provides an option where the application can select if high-level logging or in-depth logging is needed. The high-level logging is defined by the audit flag in the audit control table. If the audit flag is on, the high-level logging is needed. Otherwise, the high-level logging is not required. The high-level logging for example includes information identifying the respective application and the respective transaction that occurred.

Upon ensuring that the high-level logging is allowed, the application creates and populates an audit object with values (Step 304). The values include information identifying the respective application and the respective transaction that occurred. For example, the information includes application ID, service ID, mobile number, transaction ID, request type, request message, response message, status, request time, and source of request. Once it is determined the high-level logging is needed, another field (e.g., "REQUIRED_TRNS" field) in the audit control table is checked to determine whether a more in-depth logging is required. In-depth logging for example includes logging finger print details for the transaction. To this end, the application ensures whether finger print details are needed by checking the audit control table (Step 306). If so, the application populates the audit object with finger print details (Step 308). Then, the application drops the audit object to the centralized audit queue (Step 310).

Figure 4:
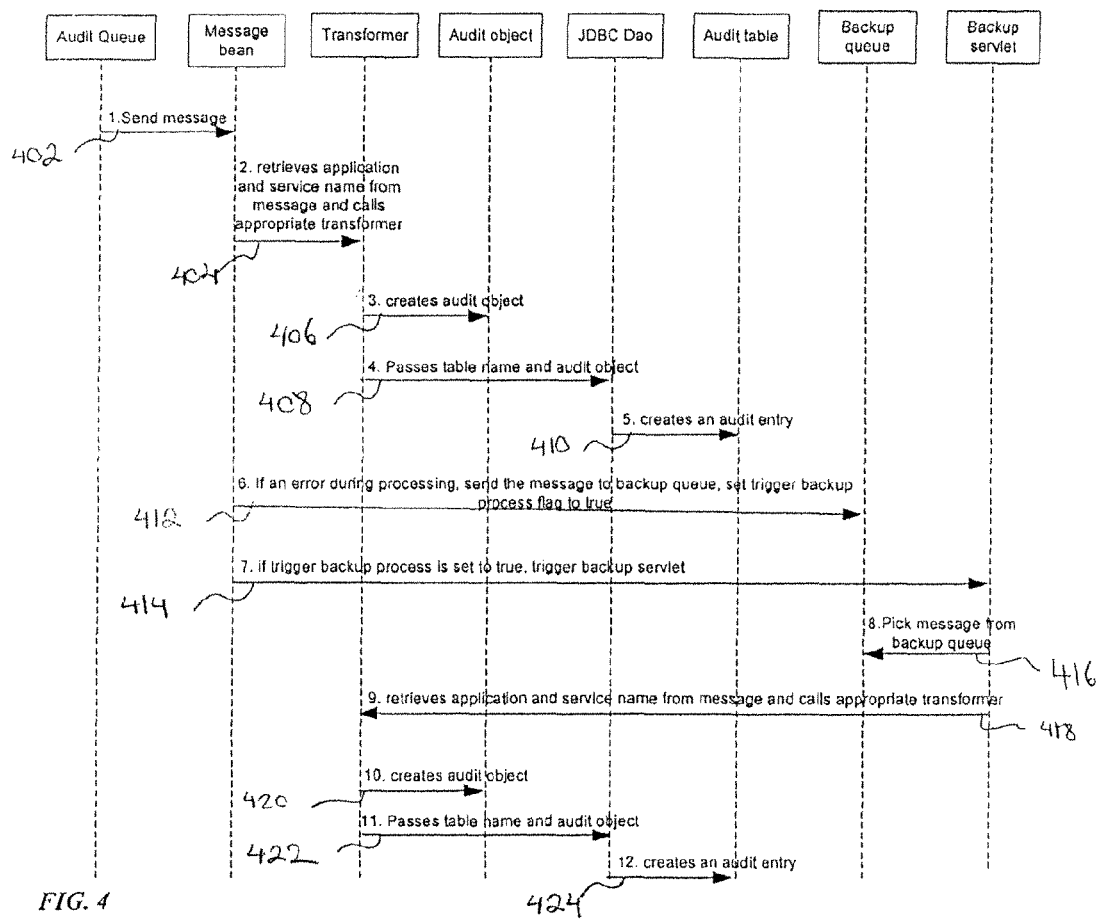
FIG. 4 illustrates an exemplary process for transforming the audit object described with respect to FIG. 3 into a common audit object and creating an entry in an application specific audit table.

FIG. 4 illustrates an exemplary process for transforming the audit object described with respect to FIG. 3 into a common audit object and creating an audit entry in an application specific audit table. Once the audit object is placed on the centralized audit queue, the centralized audit queue sends a message to the centralized message bean (Step 402) informing the centralized audit message bean of the existence of the audit object in the centralized audit queue. Alternatively, the centralized audit message bean may be actively monitoring the centralized audit queue for audit objects. In either case, the centralized message bean retrieves the audit object from the centralized audit queue and based on the application ID and service ID calls the appropriate transformer (Step 404).

The centralized audit message bean retrieves the appropriate transformer using a transformer configuration xml. The transformer configuration xml maintains mapping between the application name and the transformer to be used. The retrieved transformer transforms the audit object in the central audit queue from a format used by the application into a common format for audit processing with respect to all of the applications (Step 406). To this end, at least some of the formats used by respective applications are different from each other. The transformer then passes the application specific table name and the generic audit object to the JDBC DAO (Step 408). In response, the JDBC DAO creates an entry into the application specific audit table based on the received table name from the transformer (Step 410).

If an error occurs in calling an appropriate transformer (Step 404), creating a generic audit object (Step 406), and/or creating an entry in the application specific audit table (Step 408), the error is logged in to the central error table as discussed in more detail with respect to FIGS. 6-8. In the example of FIG. 4, however, the process also includes backup attempt to backup the audit object in the audit table for the respective application. To this end, if an error occurs, the centralized audit message bean places the audit object on a backup queue and sets a backup process flag to true (Step 412). By setting the backup process flag to true, a backup queue servlet is triggered and the backup queue name is passed thereto (Step 414). The backup queue servlet connects to the backup queue and retrieves the audit object from the backup queue (Step 416). The backup servlet retrieves the application ID and service ID from the audit object and based on the application ID and service ID, the backup queue servlet determines an appropriate transformer for converting the audit object to a generic audit object (418). Similar to the previous example, the appropriate transformer is determined by referencing the transformer configuration xml that maintains mapping between the application-service ID and the appropriate transformer.

The transformer converts the audit object into a generic audit object (Step 420) and calls the JDBC DAO passing the application specific table name and the generic audit object thereto (Step 422). The JDBC DAO will create an entry in the application specific audit table (Step 424). If an error happens in identifying an appropriate transformer for converting the audit object placed on the backup queue (Step 418), transforming the audit object to a generic audit object (Step 420), and/or creating an entry into the audit table (Step 422), the error is logged to an error file as described in more detail below with respect to FIGS. 6-8.

Figure 5A:
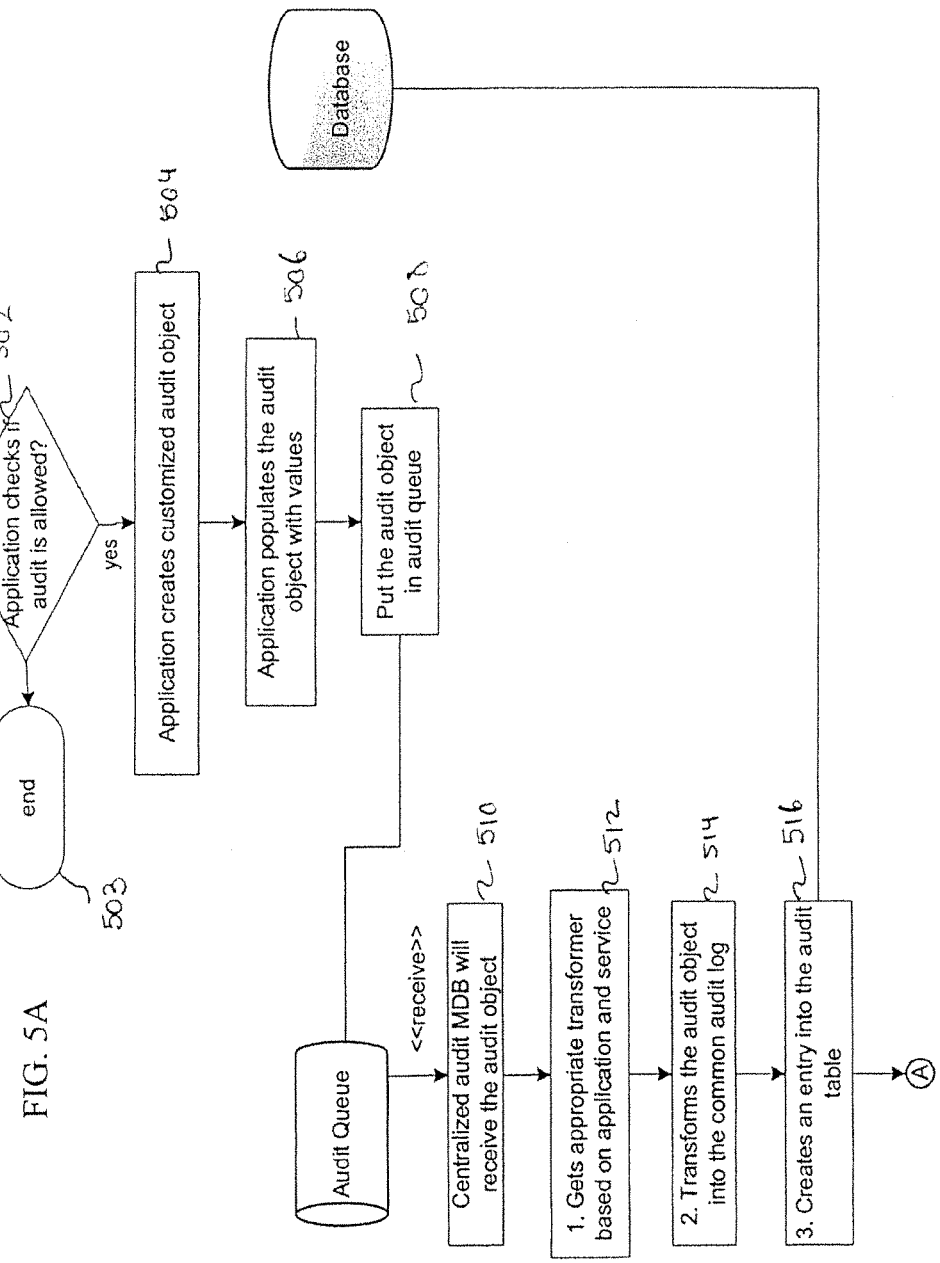
FIGS. 5A-5B illustrate the exemplary centralized audit handling process shown in FIGS. 3 and 4 in more detail.
Figure 5B:
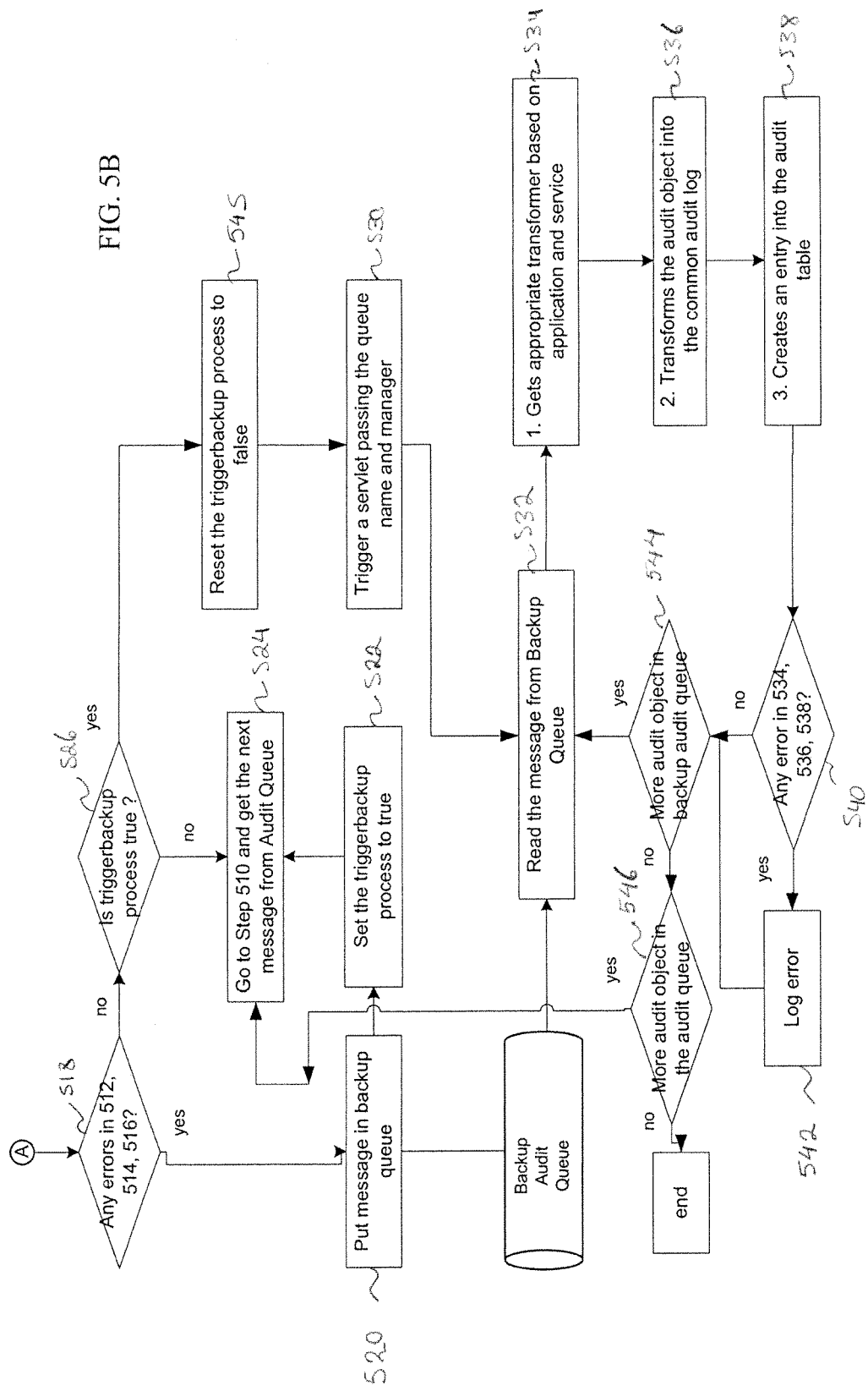
Figure 5C:
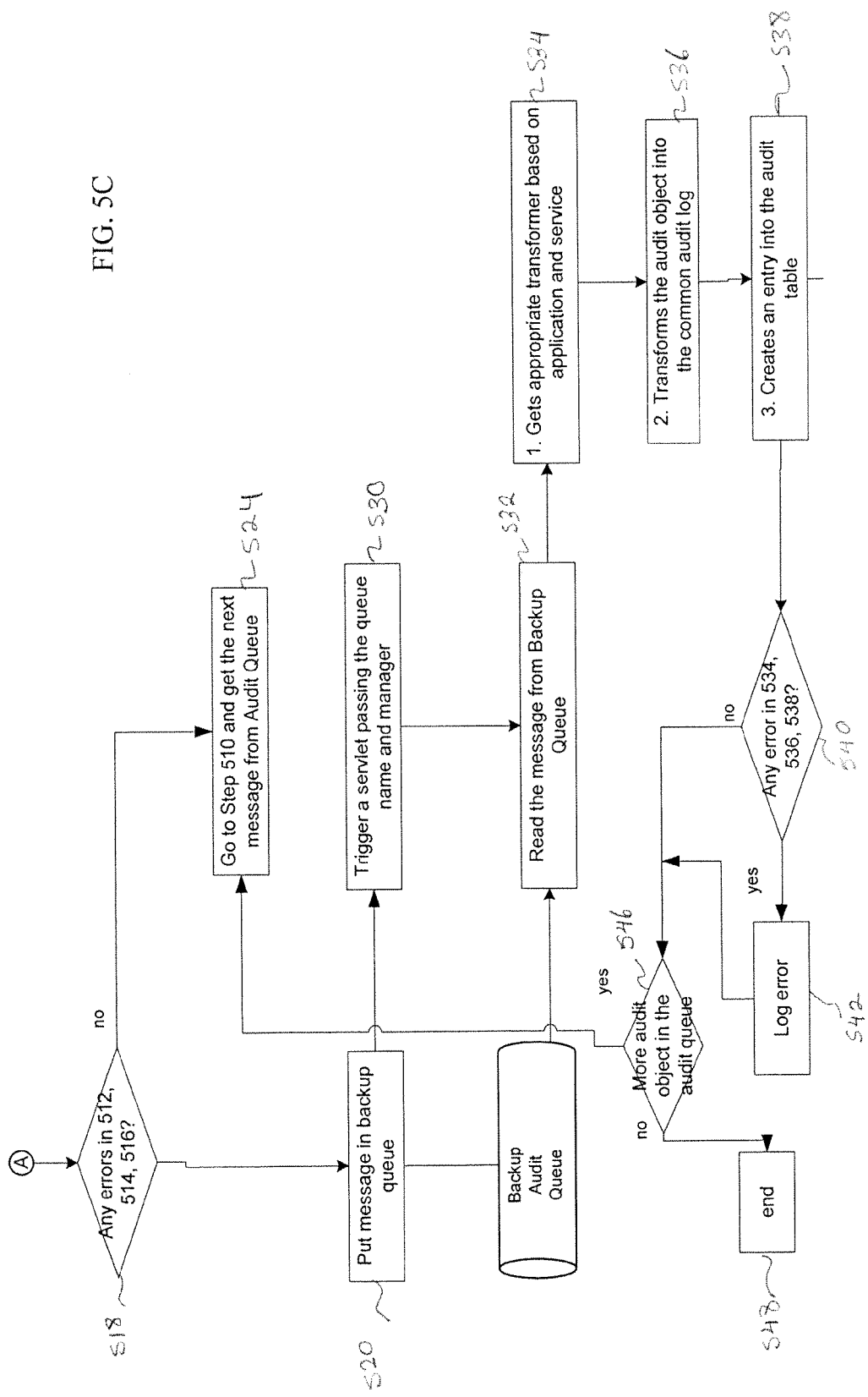
FIG. 5C illustrates an alternative process for handling audit objects placed in a backup audit queue to the process shown in FIG. 5B.
Figure 5D:
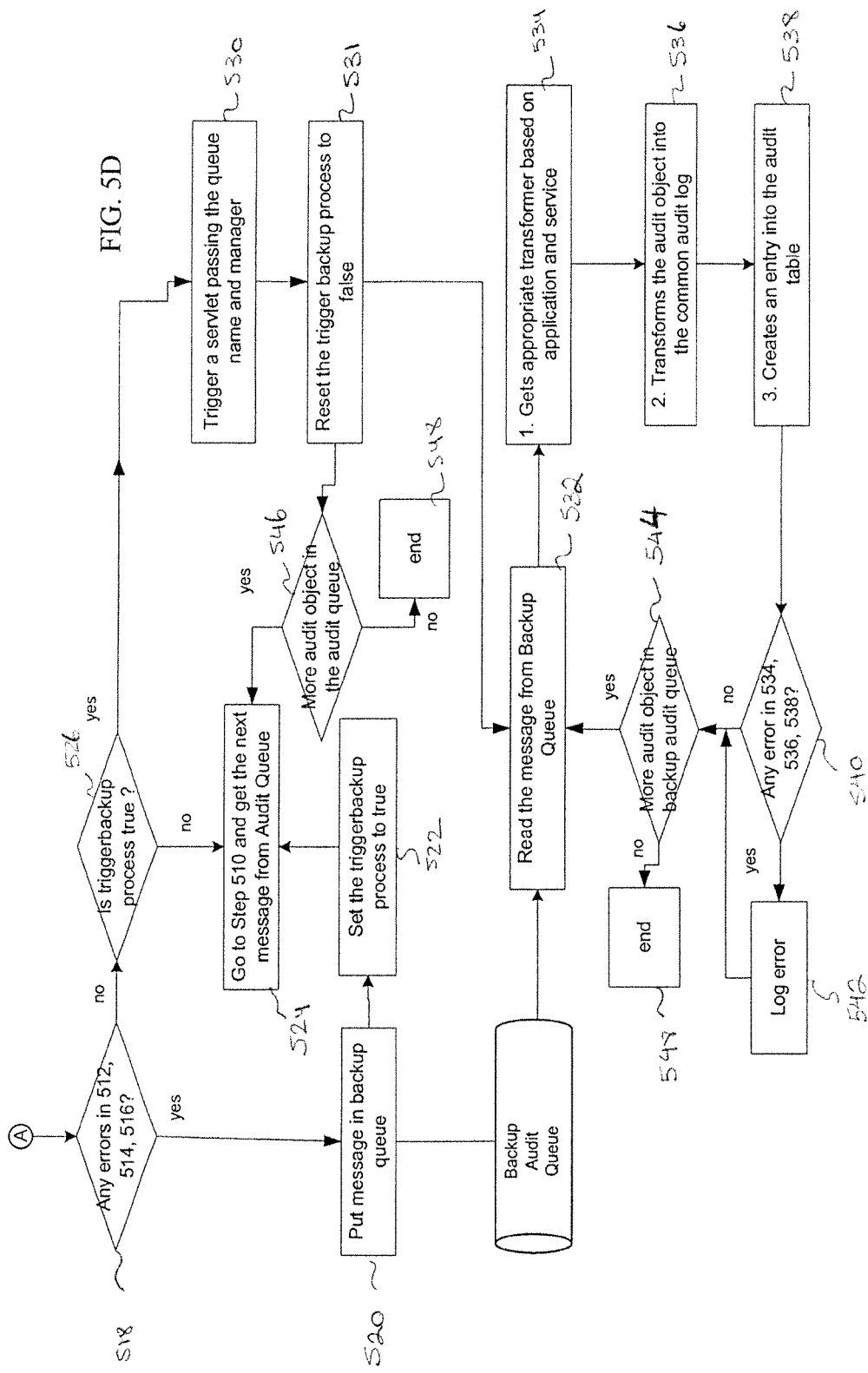
FIG. 5D illustrates an alternative process for handling audit objects placed in a backup audit queue to the process shown in FIG. 5B.

FIGS. 5A and 5B illustrate the exemplary centralized audit handling process shown in FIGS. 3 and 4 in more detail. For the sake of brevity, the redundant steps are not described in detail. The exemplary flow begins with the application checking if auditing is allowed (Step 502). If auditing is not allowed (Step 502, No), the process ends (Step 503). If, however, the auditing is allowed (Step 502, Yes), the application creates a customized audit object (Step 504) and populates the audit object with values (Step 506). The application places the audit object in the centralized audit queue (Step 508).

The centralized audit message bean listens to the centralized audit queue and retrieves the audit object from the centralized audit queue (Step 510). The centralized audit message bean retrieves the application ID and service ID from the audit object and calls the appropriate transformer accordingly (Step 512). The transformer transforms the audit object into a generic audit object (Step 514) and creates an entry into the appropriate audit table based on an audit table name from the transformer (Step 516). If an error occurs in Steps 512, 514, and 516 (Step 518, Yes), the centralized audit message bean places the audit object on the backup queue (Step 520) and sets the backup process flag to true (Step 522). In the example shown in FIG. 5B, the centralized audit message bean queues the audit objects that have encountered error in processing in the backup queue until an audit object is processed with no error. Then, the centralized audit message bean triggers the backup queue servlet to store the audit objects queued in the backup queue.

To this end, after setting the backup process flag to true (Step 522), the centralized audit message bean returns to the Step 510 to pick up the next audit object from the audit queue (Step 524). The centralized audit message bean then performs the Steps 512, 514, and 516 for the next audit object. In processing the next audit object, if no error occurs in the Steps 512, 514, and/or 516 (Step 518, No), the centralized audit message bean checks to see if the backup process flag is set to true (Step 526). If the backup process flag is not set to true (Step 526, No), the centralized audit message bean returns to the Step 510 to pick up the next audit object from the audit queue (Step 524). However, if the backup process flag is set to true (Step 526, Yes), the centralized audit message bean resets the backup process flag to false (Step 545), triggers the backup queue servlet, and passes the backup queue name and manager to the backup queue servlet (Step 530).

The backup queue servlet connects to the backup queue and reads the audit object from the backup queue (Step 532). The backup queue servlet retrieves the application ID and service ID from the audit object and based on the application ID and service ID, the backup queue servlet determines an appropriate transformer for transforming the audit object to a generic audit object (Step 534). Similar to the previous example, the appropriate transformer is determined by referencing the transformer configuration xml which maintains mapping between the application-service ID and the appropriate transformer. The transformer converts the audit object into a generic audit object (Step 536) and calls the JDBC DAO to create an entry in the audit table (Step 538). If an error occurs in identifying the appropriate transformer (Step 534), converting the audit object into the generic audit object (Step 536), and/or creating the entry into the audit table (Step 538) (Step 540, Yes), the error is logged in an error log file (Step 542) as described in more detail with respect to FIGS. 6-8.

After the error is logged in the error log file (Step 542), the backup queue servlet determines whether there are more audit objects in the backup audit queue (Step 544). Similarly, if no error occurs in the Steps 534, 536, and/or 538 (Step 540, No), the backup queue servlet determines whether there are more audit objects in the backup audit queue (Step 544). If yes (Step 544, Yes), the backup queue servlet retrieves the next audit object from the backup queue (Step 532). Thereafter, the Steps 534, 536, 538, 540, 542 (if necessary), and 544 are performed again until all audit objects in the backup audit queue are read.

Once there is no more audit object in the backup audit queue (Step 544, No), the backup process flag is reset to false and it is determined if there is an audit object in the audit queue (Step 546). If yes (Step 546, Yes), the flow returns to the Step 510 and the centralized audit message bean retrieves the next audit object from the audit queue (Step 524) and repeats the above process for the next audit object. If there is no audit object in the audit queue (Step 546, No), the process ends (Step 548).

In a slightly different implementation, the backup queue servlet triggers the backup process after the backup process flag is set to true and before processing the next audit object in the audit queue. To illustrate, referring to FIG. 5C, if an error occurs in Steps 512, 514, and 516 (Step 518, Yes), the centralized audit message bean places the audit object on the backup queue (Step 520), triggers the backup queue servlet and passes the backup queue name and manager to the backup queue servlet (Step 530).

The backup queue servlet connects to the backup queue and reads the audit object from the backup queue (Step 532). The backup queue servlet retrieves the application ID and service ID from the audit object and based on the application ID and service ID, the backup queue servlet determines an appropriate transformer for transforming the audit object to a generic audit object (Step 534). The appropriate transformer is determined by referencing the transformer configuration xml, which maintains mapping between the application-service ID and the appropriate transformer. The transformer converts the audit object into a generic audit object (Step 536) and calls the JDBC DAO to create an entry in the audit table (Step 538).

If an error occurs in the Steps 534, 536, and/or 538 (Step 540, Yes), the error is logged in an error log file (Step 542) as described in more detail with respect to FIGS. 6-8. If no error occurs in the Steps 534, 536, and/or 538 (Step 540, No) or after the error is logged in the error log file (Step 542), the centralized audit message bean determines if there is an audit object in the audit queue (Step 546). If yes (Step 546, Yes), the flow returns to the Step 510 and the centralized audit message bean retrieves the next audit object from the audit queue (Step 524) and repeats the above process for the next audit object. If there is no audit object in the audit queue (Step 546, No), the process ends (Step 548).

In a slightly different implementation, once the centralized audit message bean triggers the backup servlet, the centralized audit message bean resets the backup process flag to false and proceeds with the next audit message. The processing of the messages from the backup queue will be automatically handled by the backup servlet in parallel to processing of the audit objects in the audit queue. To illustrate, referring to FIG. 5D, if an error occurs in Steps 512, 514, and 516 (Step 518, Yes), the centralized audit message bean places the audit object on the backup queue (Step 520) and sets the backup process flag to true (Step 522). In the example shown in FIG. 5D, the centralized audit message bean queues the audit objects that have encountered error in processing in the backup queue until an audit object is processed with no error. Then, the centralized audit message bean triggers the backup queue servlet to store the audit objects queued in the backup queue.

To this end, after setting the backup process flag to true (Step 522), the centralized audit message bean returns to the Step 510 to pick up the next audit object from the audit queue (Step 524). The centralized audit message bean then performs the Steps 512, 514, and 516 for the next audit object. In processing the next audit object, if no error occurs in the Steps 512, 514, and/or 516 (Step 518, No), the centralized audit message bean checks to see if the backup process flag is set to true (Step 526). If the backup process flag is not set to true (Step 526, No), the centralized audit message bean returns to the Step 510 to pick up the next audit object from the audit queue (Step 524). However, if the backup process flag is set to true (Step 526, Yes), the centralized audit message bean triggers the backup queue servlet and passes the backup queue name to the backup queue servlet (Step 530).

The centralized audit message bean resets the backup process flag to false (Step 531). Then, the backup queue servlet connects to the backup queue and reads the audit object from the backup queue (Step 532). The processing of the messages from the backup queue will be automatically handled by the backup queue servlet in parallel to processing of the audit objects in the audit queue. To this end, after resetting the backup process flag to false (Step 532), it is determined if there is an audit object in the audit queue (Step 546). If yes (Step 546, Yes), the flow returns to the Step 510 and the centralized audit message bean retrieves the next audit object from the audit queue (Step 524) and repeats the above process for the next audit object. If there is no audit object in the audit queue (Step 546, No), the process ends (Step 548).

Concurrently, with processing of the audit objects in the audit queue, the backup process servlet process the audit objects in the backup audit queue. The backup queue servlet retrieves the application ID and service ID from the audit object and based on the application ID and service ID, the backup queue servlet determines an appropriate transformer for transforming the audit object to a generic audit object (Step 534). The appropriate transformer is determined by referencing the transformer configuration xml, which maintains mapping between the application-service ID and the appropriate transformer. The transformer converts the audit object into a generic audit object (Step 536) and calls the JDBC DAO to create an entry in the audit table (Step 538).

If an error occurs in the Steps 534, 536, and/or 538 (Step 540, Yes), the error is logged in an error log file (Step 542) as described in more detail with respect to FIGS. 6-8. After the error is logged in the error log file (Step 542), the backup queue servlet determines whether there are more audit objects in the backup audit queue (Step 544). Similarly, if no error occurs in the Steps 534, 536, and/or 538 (Step 540, No), the backup queue servlet determines whether there are more audit objects in the backup audit queue (Step 544). If yes (Step 544, Yes), the backup queue servlet retrieves the next audit object from the backup queue (Step 532). Thereafter, the Steps 534, 536, 538, 540, 542 (if necessary), and 544 are performed again until all audit objects in the backup audit queue are read. Once there is no more audit object in the backup audit queue (Step 544, No), the backup process ends (Step 548).

As discussed above with respect to FIGS. 5B-5D, the backup process can be triggered and executed in several manners. Specifically, in the example shown in FIG. 5B, the centralized audit message bean queues the audit objects that have encountered error in processing in the backup queue until an audit object is processed with no error. Then, the centralized audit message bean triggers the backup queue servlet to process the audit objects queued in the backup queue. In this example, the backup process and the centralized audit process are not running in parallel. In example shown in FIG. 5C, the centralized audit message bean triggers the backup queue servlet as soon as an audit object is placed in the backup queue. In the example shown in FIG. 5D, similar to the one shown in FIG. 5B, the centralized audit message bean queues the audit objects that have encountered error in processing in the backup queue until an audit object is processed with no error. Then, the centralized audit message bean triggers the backup queue servlet to process the audit objects queued in the backup queue. In this example, unlike the example shown in FIG. 5B, the processing of the messages from the backup queue will be handled by the backup servlet in parallel to processing of the audit objects in the audit queue. In yet another implementation (not shown), the centralized audit message bean queues the audit objects that have encountered error in processing in the backup queue until all audit objects are processed in the audit queue. Then, the centralized audit message bean triggers the backup queue servlet to process the audit objects queued in the backup queue.

FIG. 6 illustrates an exemplary architecture diagram for centralized error handling. If an application (e.g., application 1, 2, x, and/or y) encounters an error, the application calls an appropriate error handler 602. The called error handler 602 creates an error object and places the error object in a centralized error queue 604. Thereafter, an error trace handler 606 (e.g., a centralized error message bean) listening to the centralized error queue 604 retrieves the error object from the centralized error queue 604 and creates an entry for the error in a central error table 608.

To provide context and in keeping with the previous example, when VVM Gateway application encounters an error during the handling of the incoming request, the VVM Gateway application calls the error handler 602 and passes on the error details such as, for example, the error type, the error severity, and the error message to the error handler 602. The error details also include the error time, the application that created the error, the application server on which the error was triggered, and the severity of the error. The error handler 602 then creates a common error-handling object and populates the common error-handling object with the error details. The error object is placed in the error queue 604. The error trace handler 606 retrieves the error object from the error queue 604, creates an entry in the central error table 608, and places the error object within the entry. The placing includes, for example, populating the detailed information about the error occurrence from the error object into fields of the record in the central error table 608.

FIG. 7 illustrates an exemplary process for creating an error object and placing the error object on a centralized error queue. The process begins with an application notifying the error handler 602 that an error has occurred (Step 702). In response, the error handler 602 creates an error object and places the error object on the error queue 604 (Step 704). FIG. 8 illustrates an exemplary process for placing the created error object in the central error table 608. Once the error object is placed on the error queue, the error queue sends a message to the error trace handler 606 (e.g., centralized error message bean) (Step 802). The error trace handler 606 retrieves from the error object the error details and passes them to the JDBC DAO (Step 804). In response, the JDBC DAO creates an entry into the central error table 608 (Step 806).

As shown by the above discussion, functions relating to the centralized audit and error handling in the distributed application data processing systems can be performed at the server 32 shown in FIG. 1. Although special purpose devices may be used, such devices also may be implemented using one or more hardware platforms intended to represent a general class of data processing device commonly used to run server and application programming so as to implement the audit and error handling functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the thread count analyzer programming as well as associated stored data, e.g. files used for the thresholds and or to direct the paging, email and other report messages. The software code is executable by the general-purpose computer that functions as the web server, application server(s) and/or that functions as a technician's terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for centralized audit and/or error handling in distributed application data processing systems, in essentially the manner performed in the implementations discussed and illustrated herein.

Figures 9, 10:
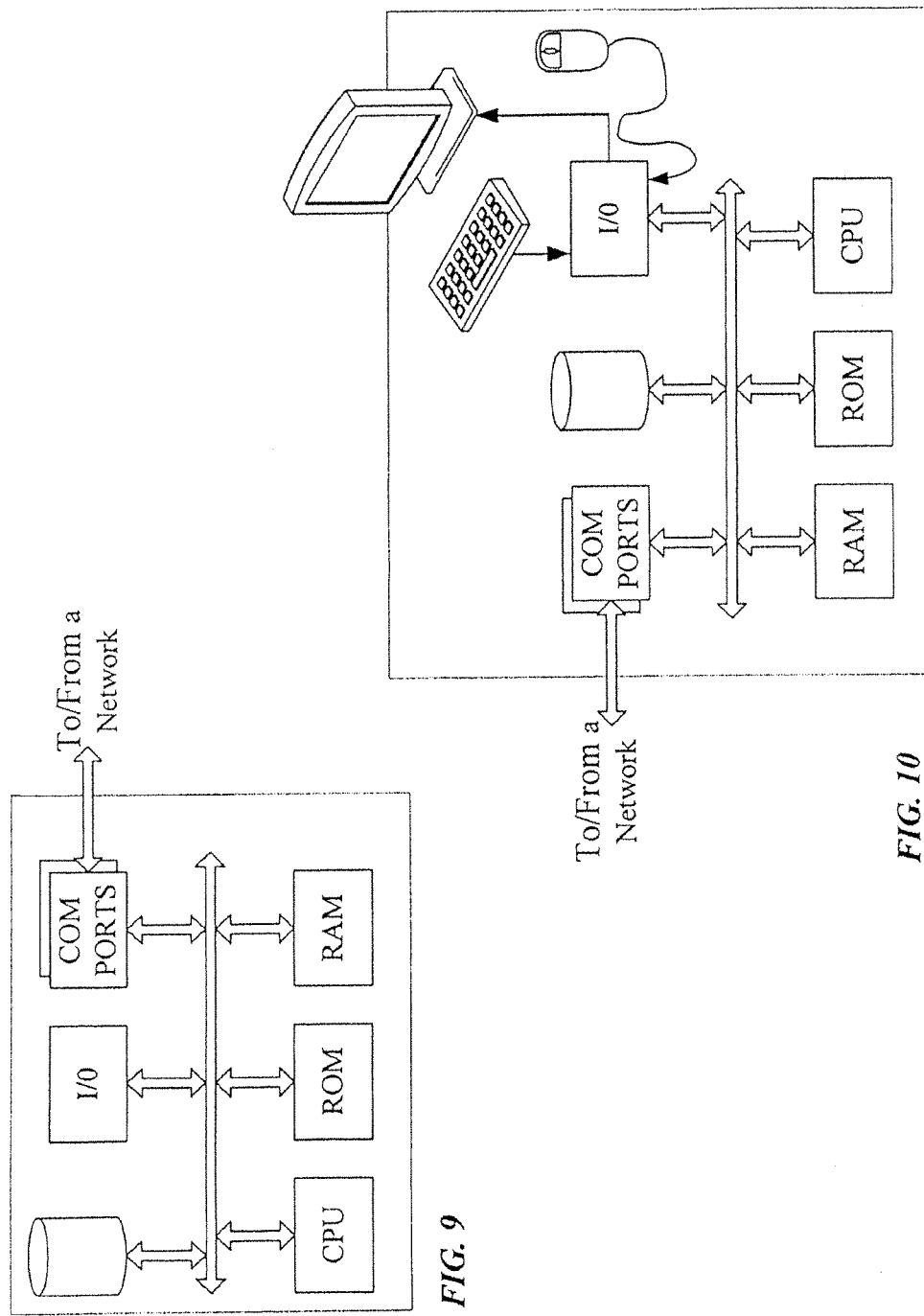
FIG. 9 is a simplified functional block diagram of a computer that may be configured as a host or server, for example, to function as any of the web or application servers in the system of FIG. 1.
FIG. 10 is a simplified functional block diagram of a personal computer or other work station or terminal device, such as that for a CCES staff person to results of the audit and error handling.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, any server functions may be implemented in a distributed fashion on a number of similar platforms, to distribute the processing load.

Hence, aspects of the methods of to provide centralized audit and/or error handling in distributed application data processing systems, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of a web server and platforms of the associated application servers that will implement the monitoring, etc. of the thread count analyzer. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of providing audit handling, the method comprising steps of:
    receiving in a central queue audit objects generated by a plurality of applications executing on one or more computers, each audit object being generated responsive to a respective transaction occurrence in the execution of a respective application in the one or more computers, each audit object including detailed information about the respective transaction occurrence and including information identifying the respective application and the respective transaction that occurred;
    identifying, based on the information identifying the respective application, a transformer for transforming each audit object in the central queue from a format used by the respective application into a common format;
    transforming using a respective identified transformer each audit object in the central queue from the format used by the respective application into the common format for audit processing with respect to all of the applications, at least some of the formats used by respective applications being different from each other; and
    placing each transformed audit object into a record in a respective audit table of a plurality of audit tables of a central database based on the respective application that generated the respective audit object, such that each respective audit table is specific to a different respective application of the plurality of applications, wherein:
    the placing includes populating the detailed information about the respective transaction occurrence from each transformed audit object into fields of the record in the respective audit table, and
    the plurality of applications includes applications associated with a mobile service provider.

2. The method of claim 1, wherein the detailed information includes application identifier (ID), service ID, transaction ID, mobile number, transaction type, response message, status, request time, or source of request.

3. The method of claim 1, further comprising steps of:
    receiving a message at a centralized audit message bean that one of the audit objects is placed on the central queue;
    in response to the message, retrieving the one of the audit objects from the central queue;
    identifying a transformer based on a type of the retrieved audit object; and
    calling the identified transformer to transform the retrieved audit object from the format used by the respective application into the common format.

4. The method of claim 1, wherein placing each transformed audit object into the record in the central database for the respective application includes passing a name of the central database for the respective application to a Data Access Object that interfaces with the central database and creates the record in the central database.

5. The method of claim 1, further comprising steps of:
    receiving in a central queue error objects generated by an error handler, each error object being generated responsive to a respective error occurrence in the execution of a respective one of the plurality of applications in the one or more computers and each error object including detailed information about the respective error occurrence, including information identifying the one of the plurality of respective applications with respect to which the respective error occurred and information about the respective error that occurred; and placing each error object into an error record in a central error table, wherein placing includes populating the detailed information about the respective error occurrence from each error object into fields of the error record in the error table.

6. The method of claim 1, wherein the applications associated with the mobile service provider include a Preference Center application configured to handle preferences of a customer of the mobile service provider.

7. The method of claim 1, wherein the applications associated with the mobile service provider include a Visual Voice Mobile (VVM) Gateway application.

8. The method of claim 1, wherein each audit object is generated responsive to the respective transaction occurrence in the execution of the respective application for which a customer pays a monthly payment to the mobile service provider.

9. The method of claim 1, further comprising, switching, by each respective application, the audit handling ON or OFF.

10. The method of claim 1, further comprising, controlling, by each respective application, a level of the audit objects being generated.

11. A system comprising:

a processing device; and a memory storing executable instructions for configuring the processing device to perform functions, comprising functions to:

receive in a central queue audit objects generated by a plurality of applications executing on one or more computers, each audit object being generated responsive to a respective transaction occurrence in the execution of a respective application in the one or more computers, each audit object including detailed information about the respective transaction occurrence and including information identifying the respective application and the respective transaction that occurred;

identify, based on the information identifying the respective application, a transformer for transforming each audit object in the central queue from a format used by the respective application into a common format;

transform using a respective identified transformer each audit object in the central queue from the format used by the respective application into the common format for audit processing with respect to all of the applications, at least some of the formats used by respective applications being different from each other; and place each transformed audit object into a record in a respective audit table of a plurality of audit tables of a central database based on the respective application that generated the respective audit object, such that each audit table is specific to a different application of the plurality of applications, wherein:

the placing includes populating the detailed information about the respective transaction occurrence from each transformed audit object into fields of the record in the respective audit table, and the plurality of applications includes applications associated with a mobile service provider.

12. A method comprising steps of:

receiving in a central queue error objects automatically generated by an error handler based on instructions received from a plurality of applications executing on a plurality of computers, each error object being automatically generated responsive to a respective error occurrence in the execution of a respective application in the plurality of computers, each error object including detailed information about the respective error occurrence, including information identifying the respective application and information about the respective error that occurred; and automatically placing each error object into a record in a central error table, wherein:

the placing includes populating the detailed information about the respective error occurrence from each error object into fields of the record in the error table, the plurality of applications includes applications associated with a mobile service provider, and each error object is generated and is placed into the record in the central error table when the respective error occurrence occurs in the execution of the respective application by retrieving error details from the error object and passing the error details to a Data Access Object, which interfaces with the central error table and creates the record in the central error table.

13. The method of claim 12, wherein placing each error object into the record in the central error table includes retrieving error details from each error object and passing the error details to a Data Access Object, which interfaces with the central error table and creates the record in the central error table.

14. The method of claim 12, further comprising steps of:

receiving a message at a centralized error message bean that one of the error objects is placed on the central queue; and in response to the message, retrieving the one of the error objects from the central queue prior to retrieving the error details from the error object and passing the error details to the Data Access Object.

15. The method of claim 12, wherein the applications associated with the mobile service provider include a Preference Center application configured to handle preferences of a customer of the mobile service provider.

16. The method of claim 12, wherein the applications associated with the mobile service provider include a Visual Voice Mobile (VVM) Gateway application.

* * * * *